(12) United States Patent
Oshima et al.

(10) Patent No.: US 9,483,217 B2
(45) Date of Patent: *Nov. 1, 2016

(54) PRINTING SYSTEM AND PRINTER

(71) Applicant: Seiko Epson Corporation, Tokyo (JP)

(72) Inventors: Yasuhiro Oshima, Matsumoto (JP);
Hirotaka Akamatsu, Matsumoto (JP);
Yasuhiro Furuta, Suwa-gun Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,795

(22) Filed: Jan. 13, 2015

(65) Prior Publication Data

US 2015/0124293 A1 May 7, 2015

Related U.S. Application Data

(63) Continuation of application No. 13/360,869, filed on Jan. 30, 2012, now Pat. No. 8,964,218.

(30) Foreign Application Priority Data

Jan. 31, 2011 (JP) .................................. 2011-017631

(51) Int. Cl.
*G06F 3/12* (2006.01)
*H04L 12/24* (2006.01)
*H04L 12/26* (2006.01)
*H04L 12/58* (2006.01)
(Continued)

(52) U.S. Cl.
CPC .......... *G06F 3/1236* (2013.01); *G06F 3/1204* (2013.01); *G06F 3/1224* (2013.01); *G06F 3/1231* (2013.01); *G06F 3/1247* (2013.01); *G06F 3/1272* (2013.01); *G06F 3/1287* (2013.01); *G06F 3/1288* (2013.01); *G06F 3/1292* (2013.01); *G06K 15/005* (2013.01); *H04L 41/0806* (2013.01); *H04L 43/0817* (2013.01); *H04L 51/08* (2013.01); *H04L 67/02* (2013.01); *H04L 67/025* (2013.01)

(58) Field of Classification Search
None
See application file for complete search history.

(56) References Cited

U.S. PATENT DOCUMENTS

2002/0064280 A1* 5/2002 Gassho .................. G06F 21/10
380/201
2003/0231338 A1* 12/2003 Haga .......................... 358/1.15
(Continued)

FOREIGN PATENT DOCUMENTS

JP 2008-071257 3/2008

*Primary Examiner* — Fan Zhang

(57) ABSTRACT

A printing server includes a registration request reception unit, a registration unit which allocates connection information for connection with the transmission origin of the registration request and an electronic mail address for receiving a printing request to the transmission origin of the registration request, a registration information transmission unit which transmits the registration information which has been allocated, a connection unit which receives the connection information and starts connection, a printing data generation unit which generates printing data, a printing waiting information transmission unit which transmits printing waiting information to the transmission origin of the XMPP connection request using XMPP when the printing data is generated, and a printing data transmission unit which receives an acquisition request for the printing data and transmits the printing data to the transmission origin of the acquisition request for the printing data according to the acquisition request for the printing data.

18 Claims, 5 Drawing Sheets

(51) Int. Cl.
*H04L 29/08* (2006.01)
*G06K 15/00* (2006.01)

(56) References Cited

U.S. PATENT DOCUMENTS

| | | | |
|---|---|---|---|
| 2007/0157291 A1* | 7/2007 | Chua | H04L 63/0807 726/4 |
| 2008/0068646 A1 | 3/2008 | Kobayashi | |
| 2009/0009797 A1* | 1/2009 | Nimura et al. | 358/1.15 |
| 2011/0085196 A1 | 4/2011 | Liu et al. | |
| 2012/0066767 A1* | 3/2012 | Vimpari | H04L 9/0866 726/26 |
| 2012/0140265 A1 | 6/2012 | Laursen et al. | |
| 2012/0194850 A1 | 8/2012 | K. et al. | |
| 2013/0010333 A1* | 1/2013 | Anand et al. | 358/1.15 |

* cited by examiner

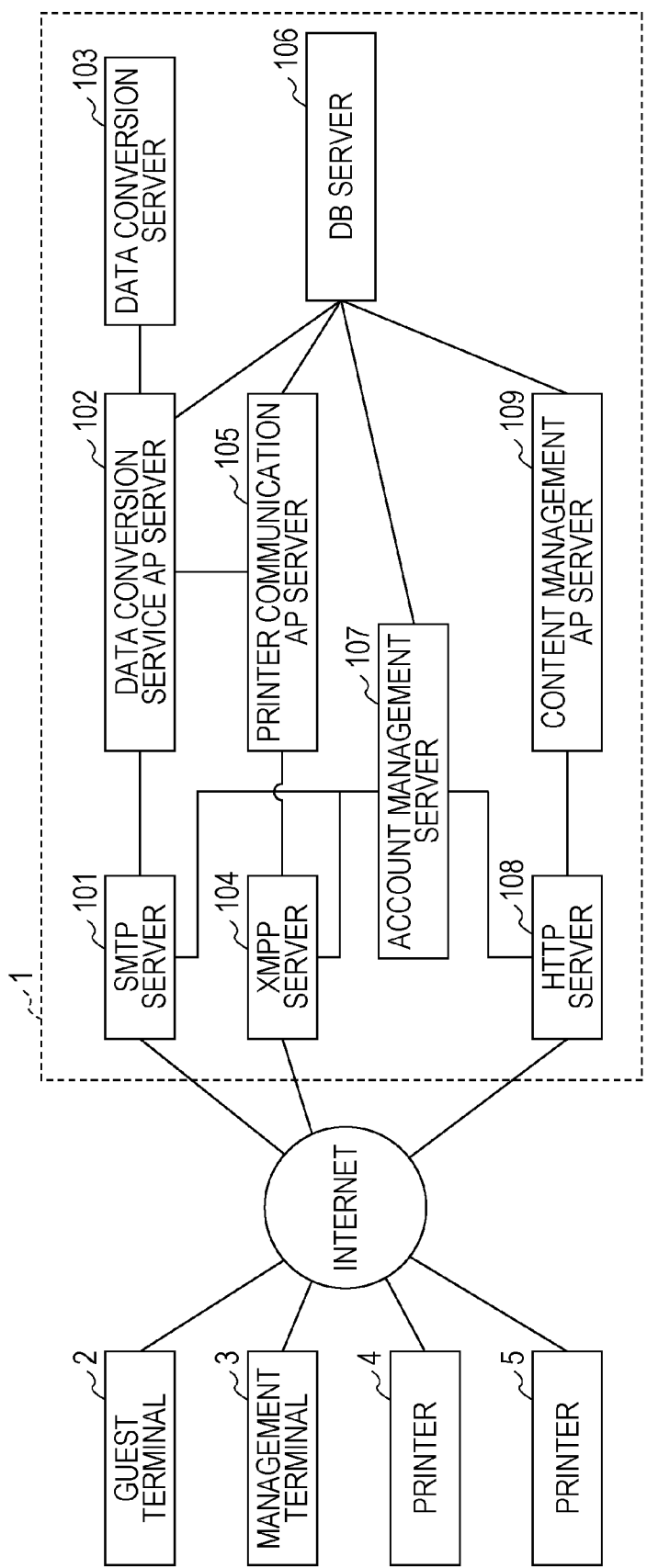

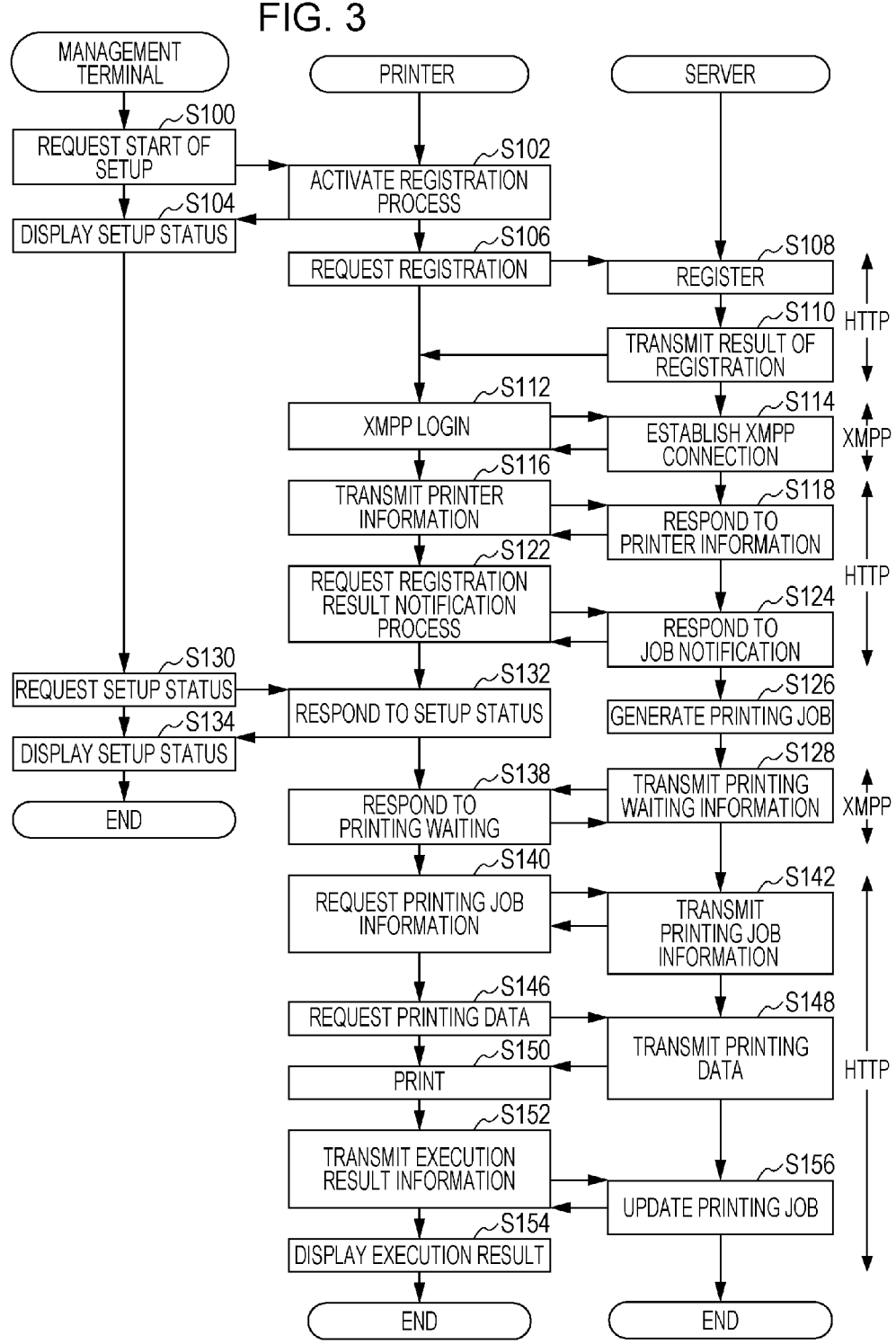

PRINTING SYSTEM AND PRINTER

CROSS REFERENCES TO RELATED APPLICATIONS

This application is a continuation of, and claims priority under 35 U.S.C. §120 on, application Ser. No. 13/360,869, filed Jan. 30, 2012, which claims priority under 35 U.S.C. §119 on Japanese Patent Application No. 2011-017631, filed Jan. 31, 2011. The content of each such related application is incorporated by reference herein in its entirety.

BACKGROUND

1. Technical Field

The present invention relates to a printing system, and in particular, relates to a technique where a printer is registered in a cloud computing system where it is possible for the main body of an electronic mail or an attached file to be printed by transmitting an electronic mail to an electronic mail address which corresponds to the printer.

2. Related Art

In the past, there was a cloud computing system which is provided with a function where an electronic mail is received and the main body of an electronic mail or an attached file is printed (for example, JP-A-2008-71257). The cloud computing system (referred to below simply as a printing system) is provided with a server which generates printing data which corresponds to a predetermined printer based on the main body of an electronic mail or an attached file when a predetermined electronic mail is received and a printer which executes printing by acquiring the printing data from the server. Accordingly, a user of the printing system is able to use the printer even in a case where a printer driver is not installed in each client such as a PC (Personal Computer) or smartphone.

In the printing system, when a printer registration process, which includes an electronic mail address being allocated to a printer in order that a printing target is received, is carried out in a server, an arbitrary user who knows the electronic mail address is able to use the printer. The registration operation for registering the printer in the printing system is performed with regard to an operation panel which is provided in the PC which is connected to the printer or in the printer.

However, in the related art, in a case where the registration operation described above is carried out, there is a problem that it is not possible for the user to reliably know whether the printer has been registered in the printing system.

SUMMARY

An advantage of some aspects of the invention is that a user is reliably notified whether or not a printer has been registered in a cloud computing system where it is possible for the main body of an electronic mail or an attached file to be printed by transmitting an electronic mail to an electronic mail address which corresponds to the printer.

A printing system according to an aspect of the invention is provided with a server which receives a printing request with regard to a predetermined printer using an electronic mail and generates printing data according to the predetermined printer based on the printing request and a plurality of printers which acquire the printing data from the server and execute printing based on the printing data. Then, the server is provided with a registration request reception unit which receives a registration request using HTTP, a registration unit which allocates XMPP connection information for connection with the transmission origin of the registration request using XMPP and an electronic mail address for receiving the printing request to the transmission origin of the registration request based on the registration request, a registration information transmission unit which transmits the electronic mail address and the XMPP connection information to the transmission origin of the registration request using HTTP, an XMPP connection unit which receives the XMPP connection information and connects with the transmission origin of the XMPP connection information using XMPP based on the XMPP connection information which has been received, a printing data generation unit which generates printing data based on the printing request, a printing waiting information transmission unit which transmits printing waiting information to the transmission origin of the XMPP connection information using XMPP when the printing data is generated, and a printing data transmission unit which receives an acquisition request for the printing data and transmits the printing data to the transmission origin of the acquisition request for the printing data according to the acquisition request for the printing data. In addition, each of the plurality of printers are provided with a registration requesting unit which transmits the registration request which includes identification information of the printer and the XMPP connection information to the server, and a registration notification unit which prints or displays whether or not connection with the server and registration to the server succeed based on information which is received from the registration information transmission unit and the XMPP connection unit.

According to the invention, whether or not there has been a process, where a predetermined printer is connected using HTTP (Hyper Text Transfer Protocol) and XMPP (eXtensible Messaging and Presence Protocol) and the printer has been registered in a printing system, is printed or displayed using the printer. As a result, it is possible reliably notify a user of whether or not a printer has been registered in the printing system which is a cloud computing system where it is possible to print a main body of an electronic mail or an attached file by transmitting an electronic mail to an electronic mail address which corresponds to the printer. In addition, according to the invention, it is not necessary for the printer to carry out polling for printing waiting information since it is possible for printing waiting information to be transmitted from the server to the printer using XMPP.

In the printing system in this case, the registration request reception unit and the XMPP connection unit may acquire language information which is set in the printer from the printer and the printing data generation unit may generate the printing data based on the language according to the language information.

Due to this, it is possible for printing data to be generated according to the destination of the printer.

Here, the function of each unit which is described according to the aspects is able to be realized using hardware resources where the functions are specified by the configuration itself, hardware resources where functions are specified by a program, or a combination of both of these. In addition, the function of each unit is not limited to being realized by hardware resources which are each physically independent from each other. For example, the server which is described according to the aspects is not limited to being realized by one computer and the server may be realized as a group where a plurality of computers is combined with each of the units being respectively allocated. Furthermore, the invention is also established as a method, as a computer program in which the above-described functions are realized by a server and a printer, or as a recording medium of a program. Of course, the recording medium of the computer program may be a magnetic recording medium, a magneto-optical recording medium, or may be a recording medium which is developed in the future.

BRIEF DESCRIPTION OF THE DRAWINGS

The invention will be described with reference to the accompanying drawings, wherein like numbers reference like elements.

FIG. 1 is a block diagram illustrating a printing system.

FIG. 3 is a sequence diagram illustrating a setup sequence.

DESCRIPTION OF EXEMPLARY EMBODIMENTS

Figure 2A:
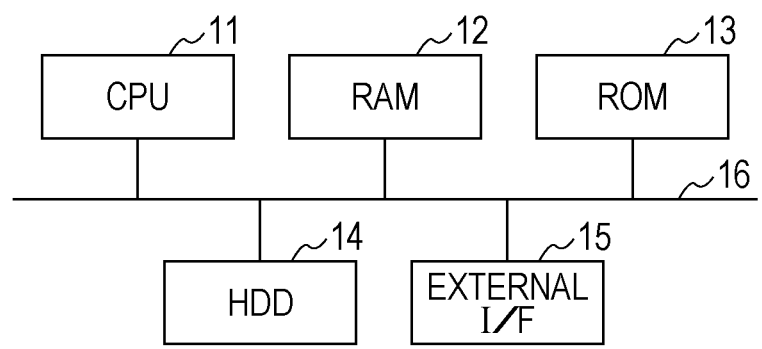
FIG. 2A is a block diagram illustrating a configuration of a server and FIG. 2B is a block diagram illustrating a configuration of a printer.

Below, embodiments of the invention will be described while referencing the attached diagrams. Here, the same reference numerals are attached to corresponding constituent elements in each diagram and overlapping descriptions are not included.

1. CONFIGURATION

FIG. 1 is a block diagram illustrating a printing system as an embodiment of the invention. The printing system is configured as a cloud computing system where it is possible to print a main body of an electronic mail or an attached file by transmitting an electronic mail to an electronic mail address which corresponds to printers 4 or 5 which are registered, and is provided with a server 1 and a plurality of printers 4 and 5.

The server 1 of the present example is configured from an SMTP server 101, a data conversion service application (AP) server 102, a data conversion server 103, an XMPP server 104, a printer communication AP server 105, a DB server 106, an account management server 107, an HTTP server 108, and a content management AP server 109.

The SMTP server 101 is a server which has a function of receiving an electronic mail which is transmitted with the electronic mail address which has been registered as a destination.

The data conversion service AP server 102 which is a printing data generation unit is a server which has a function of extracting the main body and the attached file from an electronic mail which is received by a SMTP server as a printing request, transferring the main body and the attached file to the data conversion server 103 as a printing target, and generating a printing job by acquiring printing data from the data conversion server 103.

The data conversion server 103 which is a printing data generation unit is a server which has a function of converting a file which is acquired as the printing target from the data conversion service AP server 102 to printing data, and for example, generates printing data using page description language which is specialized for text or page description language which is specialized for images.

The DB server 106 is a database server which manages various types of information on the printer 4 and 5 and stores printing jobs so as to correspond to the printer 4.

The XMPP server 104 which is an XMPP connection unit and a printing waiting information transmission unit is a server which has a function of transmitting and receiving various types of parameters by communication with the printer 4 and 5 using XMPP.

The printer communication AP server 105 which is a printing waiting information transmission unit is an application server which relays between the XMMP server 104 and the other servers and has functions such as generating printing waiting data.

The account management server 107 which is a registration unit is a server which has a function of registering the printers 4 and 5 in the printing system.

The HTTP server 108 which is a registration request reception unit, a registration information transmission unit, and a printing data transmission unit is a server which has a function of transmitting and receiving various types of parameters by communication with the printer 4 and 5 using HTTP.

The content management AP server 109 is an application server which relays between the HTTP server 108 and the other servers and has functions such as acquiring a printing job from the DB server 106 and transferring the printing job to the HTTP server 108.

Each of the SMTP server 101, the data conversion service AP server 102, the data conversion server 103, the XMPP server 104, the printer communication AP server 105, the DB server 106, the account management server 107, the HTTP server 108, and the content management AP server 109 are provided with a CPU 11, a RAM 12, a ROM 13, a hard disk drive (HDD) 14, an external interface (I/F) 15, and an internal interface (I/F) 16 which is connected to these as shown in FIG. 2A. An activation program is stored in the ROM 13. The HDD 14 stores an operating system (OS) and a computer program for realizing each of the functions which are described above. These programs are loaded into the RAM 12 and are executed using the CPU 11. The external I/F 15 is configured with an interface or the like for connecting an interface for connection with other servers, the printers 4 and 5, and the like via the Internet and peripheral devices.

Figure 2B:
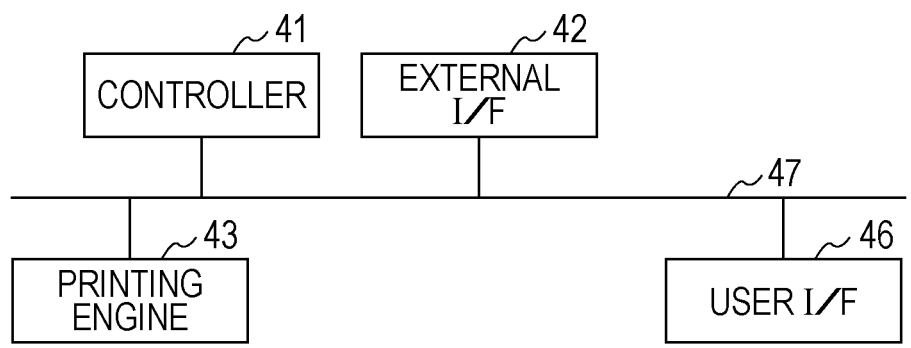

Each of the printers 4 and 5 are provided with a controller 41, an external I/F 42, a user I/F 46, a printing engine 43, and an internal I/F 47 which is connected to these as shown in FIG. 2B. The controller 41 is formed from a CPU, a nonvolatile memory, a RAM, an ASIC, and the like and executes a process for controlling the operation of the printing engine 43 by executing a process for controlling an operation of the printing engine 43 using the execution of a printing program. In addition, the controller 41 executes a process for registering the printers 4 and 5 in the printing system by communicating with a management terminal 3 and the server 1 using the execution of a web service program which is stored in the nonvolatile memory and for acquiring printing data from the server 1. That is, the web server program functions as the controller 41 which is a registration requesting unit and a registration notification unit. The printing engine 43 which is a registration notification unit is provided with an actuator, a sensor, a driving circuit, and a mechanical component for executing printing using a printing method which is common knowledge such as an ink jet method or a laser method. The external I/F 42 includes an interface for connecting to the server 1 and the management terminal 3 via the Internet. The user I/F 46 is an operation panel which is configured by a display, operation keys, and the like.

2. SETUP SEQUENCE

The printers 4 and 5 are embedded into the printing system due to being registered in the server 1 and are able to execute printing according to a printing request which is received by the server 1. FIG. 3 is a diagram illustrating a setup sequence for registering the printers 4 and 5 in the server 1.

In the embodiment, a sequence will be described where the printer 4 is registered in the server 1 by operating the management terminal 3 formed from a PC (Personal Computer) which is owned by the owner of the printer 4.

First, the management terminal 3 which is executed using a web browser or the like transmits a setup start request to the printer 4 by communicating with the printer 4 using HTTP (S100). For example, the management terminal 3 transmits a DNS mode, a primary DNS, a secondary DNS, a proxy mode, an address of a proxy server, or a port number of a proxy server as the setup start request to the URL of the printer 4 which corresponds to the setup start request using HTTP.

The printer 4 which acquires the setup start request activates the registration process and transmits registration state information to the management terminal 3 using HTTP (S102). The registration state information includes reception or non-reception (success or failure), a DNS mode, a primary DNS, a secondary DNS, a proxy mode, an address of a proxy server, a port number of a proxy server, a web service mode, a URL, registration state of the printer 4 to the server 1 (registration completed or unregistered), URL of a management page which corresponds to the printer 4, a login password of the management page which corresponds to the printer 4, an electronic mail address which is allocated to the printer 4, the connection state of the HTTP server 108 and the printer 4, and the connection state of the XMPP server 104 and the printer 4. At this stage, since the registration of the printer 4 has not been carried out in the server 1, the registration state information which includes the registration state of "unregistered" is transmitted to the management terminal 3.

The management terminal 3 which receives the registration state information displays the setup status on a screen based on the registration state information which has been received (S104). At this stage, for example, an HTML document which includes text or an image which indicates that setup is in progress is displayed on the screen of the management terminal 3 using a browser.

The printer 4 which transmits the registration state information according to the setup start request transmits a model unique ID of the printer 4, the serial number of the printer 4, and an existing information deletion flag to a URL of the HTTP server 108 which corresponds to the registration request as the registration request which corresponds to the printer 4 using HTTP (S106).

The server 1 which acquires the registration request in the HTTP server 108 registers the printer 4 in the server 1 as an output unit of the printing system based on the registration request (S108).

Specifically, the account management AP server 107 which acquires the parameters of the registration request from the HTTP server 108 allocates an internal ID which corresponds to the model unique ID and the serial number of the printer 4, an XMPP login password, a URL of a management page, a management page password, and an electronic mail address to the printer 4 so as to not overlap with other printers while referencing the registration information of the registration information of other printers which are already registered in the DB server 106. The allocation is free, but even in a case where the serial number is allocated to printers with a system which is different for each model based on the model unique ID and the serial number of the printer 4, it is possible to reliably allocate the internal ID which is different for each unit of the printer to the printer 4 by allocating the internal ID.

The management page is an HTML document for editing this information which is stored in the DB server 106 using HTTP.

Then, the account management server 107 stores the XMPP login password, the URL of the management page, the management page password, and the electronic mail address in the DB server 106 as the registration information of the printer 4 so as to correspond to the internal ID which corresponds to the model unique ID and the serial number of the printer 4.

Furthermore, the account management server 107 registers the electron mail address which is allocated to the printer 4 in the SMTP server 101. It is possible for the server 1 to receive an electronic mail as a printing request where the printer 4 is the output unit by the electronic mail address which is allocated to the printer 4 being registered in the SMTP server 101.

In addition, the account management server 107 registers the internal ID which is allocated to the printer 4 in the XMPP server 104 so as to correspond to the XMPP login password. An XMPP JID for the XMPP server 104 to communicate with the printer 4 using XMPP becomes "internal ID"@"XMPP domain name of the XMPP server 104" in the embodiment. It is possible for the printer 4 and the server 1 to communicate using XMPP by the internal ID of the printer 4 and the XMPP login password being registered in the XMPP server 104 as XMPP connection information. Here, in a case where a plurality of the XMPP servers are provided to the server 1 so as to disperse the load, it is necessary for the XMPP server which corresponds to a certain printer to be allocated to each printer and registered in the DB server 106.

The account management server 107, where the printer 4 is registered in the server 1 as the output unit of the printing system, transmits the registration result information of the printer 4 to the printer 4 which is the transmission origin of the registration request via the HTTP server 108 (S110). The internal ID which is allocated to the printer 4, the XMPP login password, the URL of the management page, the management page password, the electronic mail address, the domain name of the XMPP server 104, and the reception or non-reception of the registration request (success) are included in the registration result information in a case where the registration is successful. On the other case, in a case where registration fails, the reception or non-reception of the registration request (failure) is transmitted to the printer 4 as the registration result information. Here, since it is necessary to transmit information which is necessary for the printer to generate the XMPP JID, the XMPP JID itself may be transmitted by being included in the registration result information when the registration is successful. Here, in a case where a plurality of the XMPP servers are provided to the server 1 so as to disperse the load, it is necessary that the domain name of the XMPP server which is allocated to the printer 4 is notified to the printer 4, but in a case where a XMPP server which communicates with all of the printers which are registered in the server 1 is shared and it is possible for the XMPP JID to be generated in the printer, it is not necessary that the domain name of the XMPP server is necessarily notified to the printer 4.

The printer 4 which acquires the registration information from the HTTP server 108 stores the internal ID which is allocated to the printer 4, the XMPP login password, the URL of the management page, the management page password, the electronic mail address, the domain name of the XMPP server 104 in a nonvolatile memory, generates the XMPP JID from the internal ID and the XMPP domain name, and transmits the XMPP JID and the XMPP login password to the XMPP server 104 as the XMPP connection information (S112).

The XMPP server 104 which acquires the XMPP JID and the XMPP login password from the printer 4 establishes XMPP communication with the printer 4 and transmits the XMPP connection result (success) to the printer 4 (S114). When the XMPP connection is successful at this time, the XMPP connection of the printer 4 and the XMPP server 104 continues until the power source of the printer 4 is cut off. If there is a case where it is not possible to establish the XMPP connection here, the process is completed by the XMPP connection result (failure) being transmitted to the printer 4. In this case, a repeat process may be tried.

When the XMPP connection with the server 1 is established, the printer 4 transmits printer information to the HTTP server 108 (S116). The printer information includes the internal ID which is allocated to the printer 4, a version of the communication arrangement, printer menu type information (destination information), printer submenu type information (destination information), and printer language information, and is transmitted to the URL of the HTTP server 108 which corresponds to the printer information using HTTP. By the printer information which includes the language information and the like being transmitted to the server 1, it is possible for printing data such as a registration report or a printing report to be generated in the server 1 according to the destination of the printer 4.

When the SMTP server 101 receives the printer information from the printer 4, the content management AP server 109 stores the printer information in the DB server 106 so as to correspond to the internal ID and transmits a reception result (success) to the printer 4 which is the transmission origin in a case where the reception of all of the printing information is successful (S118). The printer information of the printer 4 is stored in the DB server 106 until the XMPP connection with the printer 4 is complete. However, in a case where at least a portion of the reception of the printing information fails, the transmission of the printing information to the printer 4 is repeated until the reception of the printing information is successful or until a predetermined number of times has past by transmitting the reception result (failure) to the printer 4 which is the transmission origin.

The printer 4 which receives the reception result (success) of the printer information transmits a registration result notification job generation request to the SMTP server 101 (S122). The registration result notification job is a printing job for printing the registration content of the printer 4 to the server 1 using the printer 4. Specifically, the internal ID is transmitted to the URL of the SMTP server 101 which corresponds to the registration result notification job generation request as the registration result notification job generation request.

The SMTP server 101 which receives the registration result notification job generation request transmits the reception result (success) to the printer 4 which is the transmission origin (S124).

When the reception result (success) of the registration result notification job generation request is transmitted from the SMTP server 101 to the printer 4 which is the transmission origin, the server 1 generates a registration result notification job in order for the printer 4 to print the registration report (S126). Specifically, it is as follows. First, the content management AP server 109 acquires the internal ID of the printer 4 from the registration result notification job generation request and acquires information which is to be notified to the user of the management terminal 3 such as the URL of the management page, the management page password, the electronic mail address, and the like which are stored so as to be linked to the internal ID which has been acquired, the model unique ID of the printer 4 which is stored to correspond to the internal ID, and the language information of the printer from the DB server 106. Next, the content management AP server 109 requests information which is to be notified to the user of the management terminal 3 which has been acquired from the DB server 106 from the data conversion AP server 102 so that the generation of the printing data, which is expressed in a language (for example, the Japanese language if a Japanese language display is set in the printer or the English language if an English language display is set in the printer) which is indicated by the language information in the printing data of the printer for printing as the registration report using the printer 4, corresponds to the job ID and the model ID. The data conversion service AP server 102 which receives the request generates the printing data which corresponds to the model unique ID in the data conversion server 103. Next, the data conversion service AP server 102 acquires the printing data from the data conversion server 103, stores the printing data in the DB server 106 so as to correspond to the internal ID and the job ID as the printing job of the printer 4, and the generation of the new printing job is notified to the printer communication AP server 105 along with the internal ID of the printer 4.

The server 1 which generates the registration result notification job notifies the printer 4 which is the transmission origin of the registration request of the generation of the new printing job using XMPP (S128). Specifically, the printer communication AP server 105 which has been notified of the generation of the new printing job notifies the printer 4 of printing waiting information which indicates that a new printing job of the printer 4 has been generated via the XMPP server 104. At this time, the XMPP server 104 specifies the other party of the XMPP communication to the printer 4 based on the internal ID which is acquired from the printer communication AP server 105 and transmits the printing waiting information to the printer 4 using XMPP. The process, which is from the generation of the printing job up until the printing waiting information is transmitted to the printer 4 in this manner, is able to be automatically executed by the server 1 since the printing waiting information is transmitted using XMPP and polling from the printer 4 is not necessary. Accordingly, it is possible for the generation of the printing job to be immediately notified to the printer 4, and in addition, it is possible for the printer 4 to be notified of the generation of the printing job with a minimum amount of communication.

The printer 4 which acquires the printing waiting information transmits the reception result (success) to the XMPP server 104 using XMPP (S138).

Next, the printer 4 requests the printing job information, which is necessary for the printing data to be acquired, from the server 1 (S140). Specifically, the printer 4 transmits the internal ID of the printer 4 to the URL of the HTTP server 108 which corresponds to the request for the printing job information using HTTP.

The server 1 which receives the request for the printing job information transmits the reception result (success), the job ID, the URL of the HTTP server 108 which corresponds to the job ID, and the type of page description language of the printing data to the printer 4 as the printing job information (S142). Specifically, the content management AP server 109 acquires the internal ID which is acquired by the HTTP server 108 as a request for the printing job information and transfers the job ID, the printing data, and the page description language of the printing data which are stored to correspond to the internal ID to the HTTP server 108 by being acquired from the DB server 106. The HTTP server 108 generates a URL which receives a printing data acquisition request which corresponds to the job ID and transmits the reception result (success), the job ID, the URL which receives the printing data acquisition request, and the type of page description language of the printing data to the printer 4 as the printing job information using HTTP.

The printer 4 which acquires the printing job information waits for the printer 4 to be in an idle state and requests the printing data when in an idle state (S146). Specifically, the printer transmits the internal ID of the printer 4 to the URL of the HTTP server 108 which receives the printing data acquisition request as the printing data acquisition request via HTTP.

The server 1 which requests the printing data transmits the reception result (success) and the printing data which is requested to the printer 4 using HTTP (S148). Specifically, the HTTP server 108 transmits the printing data which corresponds to the URL which receives the printing data request and the reception result to the printer 4 using HTTP.

The printer 4 which acquires the printing data performs analysis of the printing data based on the page description language of the printing data and executes the printing of the registration report based on the printing data (S150).

The printer 4 which has completed printing transmits the execution result information to the HTTP server 108 (S154). Specifically, the printer 4 transmits the internal ID of the printer 4, the job ID which executed the printing, the execution result of the printing job (success or failure), and the reason for the execution result (normal, paper jamming, out of ink, or the like) to the URL of the HTTP server 108 which corresponds to the execution result information (S152).

The server 1 which acquires the execution result information in the HTTP server 108 updates the printing job based on the execution result information (S156). Specifically, the HTTP server 108 transmits the reception result (success) of the execution result information to the printer 4 and the content management AP server 109 deletes the printing data which corresponds to the job ID from the DB server 106 if the printing job execution result indicates a success based on the execution result information which is received by the HTTP server 108. However, in a case where at least a portion of the reception of the execution result information fails, the transmission of the execution result information to the printer 4 is repeated until the reception of the execution result information is successful or until a predetermined number of times has past by transmitting the reception result (failure) to the printer 4 which is the transmission origin.

In the execution of the setup sequence described above, the management terminal 3 which transmits the setup start request periodically requests the setup status from the printer 4 (S130). Specifically, a setup status request is transmitted to the URL of the printer 4 which corresponds to the setup status request.

The printer 4 which receives the setup status request transmits the registration state information to the management terminal 3 using HTTP (S132). The registration state information is the same as the content which the printer 4 transmits to the management terminal 3 immediately after acquiring the setup start request in S102.

The management terminal 3 which receives the registration state information displays the registration state on a screen based on the registration state information which was received in the same manner as S104 (S134). At a stage where the registration of the printer 4 to the server 1 is complete, for example, an HTML document, where the URL of the management page, the management page password, the electronic mail address, and the like are described, are displayed on the screen of the management terminal 3 using a browser.

Here, in the series of sequences where the printer 4 is registered in the server 1, when there is failure in the reception of the registration request, failure in the XMPP connection, failure in the reception of the printer information, failure in the reception of the printing waiting information, failure in the reception of the printing job information request, failure in the reception of the printing data request, or failure in the reception of the printing job execution result information, error information is transmitted from the server 1 to the management terminal 3 using HTTP. For example, an HTML document where the content of the failed process, the cause of the failure, and the like is described is transmitted from the server 1 to the management terminal 3 as error information. As a result, an error notification is displayed in the screen of the management terminal 3 which received the error information using the browser based on the error information.

In the setup sequence described above, the reception or non-reception of the registration request, the registration result information, the XMPP connection result, the reception result of the printer information, and the registration result notification job generation request are transmitted from the server 1 to the printer 4 in a process where the printer 4 is registered in the server 1 while the printer 4 is connected using HTTP (Hyper Text Transfer Protocol) and XMPP (eXtensible Messaging and Presence Protocol). This information indicates the connection or non-connection of the HTTP connection and the XMPP connection between the printer 4 and the server 1 and whether or not registration, which is necessary for the server 1 to process the printing request with regard to the printer 4, has been performed. Accordingly, it is possible for the connection or non-connection of the printer 4 and the server 1 and the registration or non-registration of the printer 4 with regard to the server 1 based on this information to be printed by the printer 4 or displayed on the display of the user I/F 46. As a result, it is possible to the user to be reliably notified on whether or not the printer 4 is registered in the printing system which is a cloud computing system where the main body of an electronic mail or an attached file is able to be printed by an electronic mail being transmitted to the electronic mail address which corresponds to the printer 4.

3. LOGIN SEQUENCE

Figure 4:
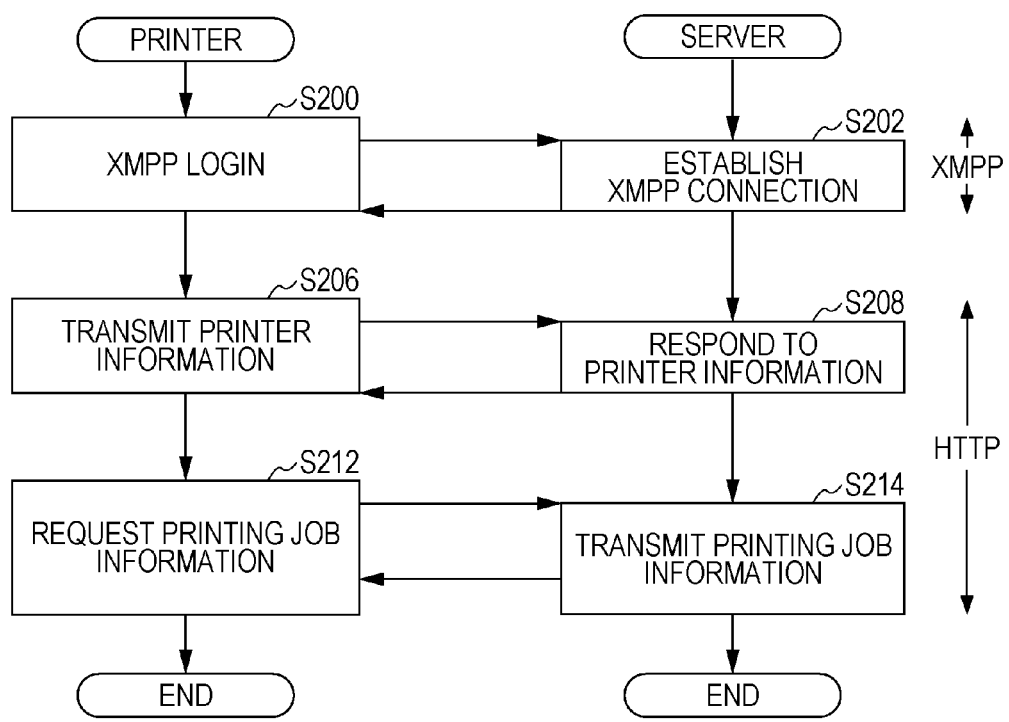
FIG. 4 is a sequence diagram illustrating a login sequence.

FIG. 4 is a diagram illustrating a login sequence. The login sequence starts when the power source is input by the power source button being pressed again after the power source is cut off by the power source button of the printer 4 being pressed by the user after the setup sequence has been completed. In the login sequence, the printer 4 performs an initialization process for each section, establishes an XMPP connection with the server 1, and performs confirmation of the printing job.

Specifically, in the same manner as S112 of the setup sequence, the printer 4 transmits the XMPP connection information to the XMPP server 104 (S200). The XMPP server 104 which acquires the XMPP connection information establishes the XMPP connection in the same manner as S114 (S202).

The printer 4 where the XMPP connection with the server 1 has been established transmits the printer information to the server 1 using HTTP in the same manner as S116 of the setup sequence (S206). That is, the transmission of the printer information is executed each time the XMPP connection is established with the server 1. The server which acquired the printer information transmits the reception result to the printer 4 using HTTP in the same manner as S118 and the printer information is stored until the completion of the XMPP connection (S208).

The printer 4 which transmits the printer information to the server 1 requests printing job information from the server 1 using HTTP in the same manner as S140 of the setup sequence (S212). The server 1 which acquires the request for printing job information transmits the printing job information to the printer 4 using HTTP in the same manner as S142 (S214). The printer 4 which acquires the printing job information executes printing by requesting the printing data if there is a printing job. By the printer 4 automatically acquiring the printing job information after the input of the power source in this manner, it is possible for the printer 4 to execute the printing job, which is generated in the server 1 while the power source is cut off, immediately after the power source is input.

4. PRINTING SEQUENCE

Figure 5:
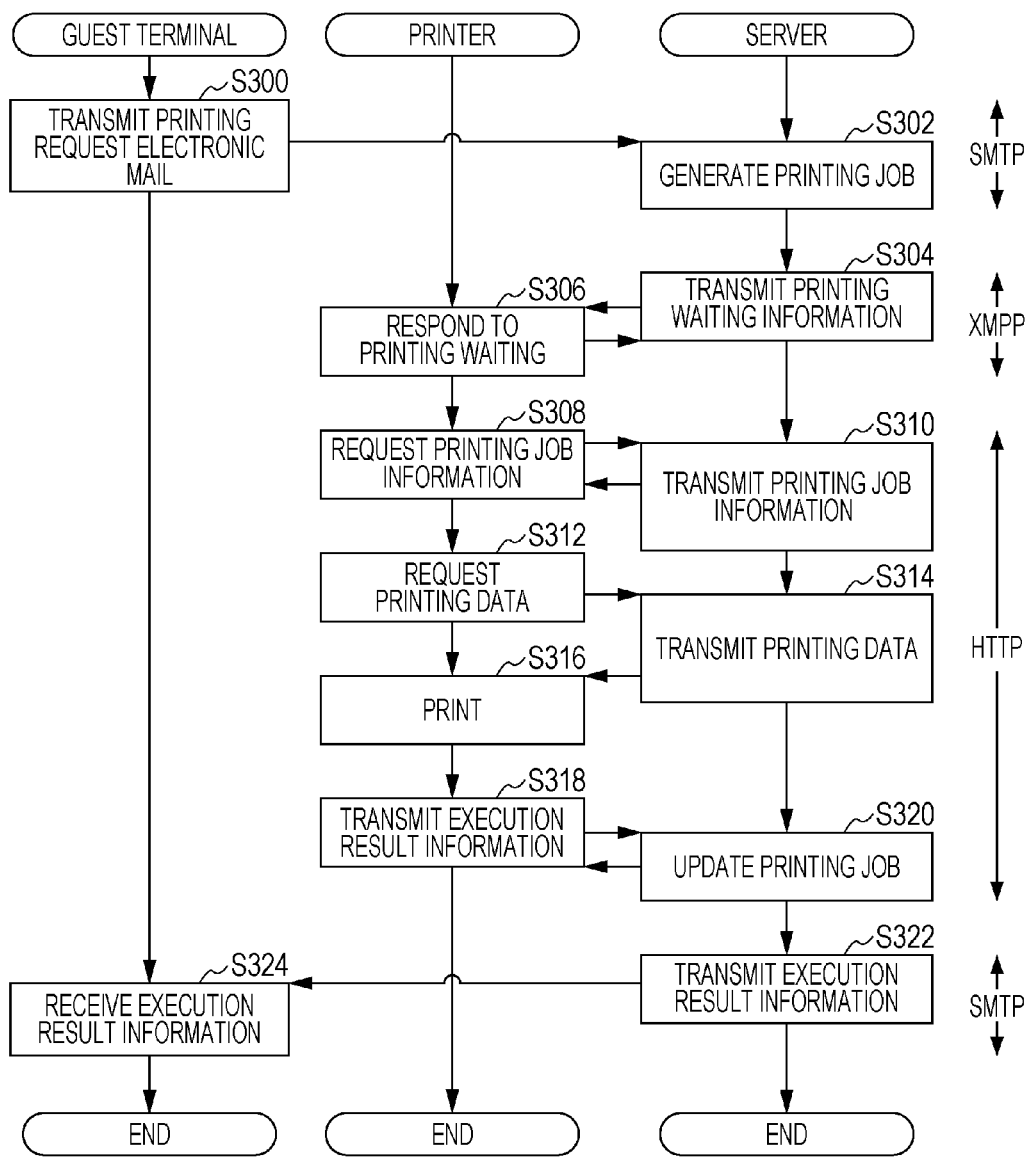
FIG. 5 is a sequence diagram illustrating a printing sequence.

FIG. 5 is a sequence diagram illustrating a printing sequence. The printing sequence is started by an electronic mail which is a printing request being transmitted from the management terminal 3 or the guest terminal 2 to the electronic mail address which has been registered (S300). The server 1 processes the main body of the electronic mail or the attached file, which are received in the electronic mail address which is registered, as the printing target as will be described later. As a result, when the user transmits the electronic mail where the main body or the attached file is the printing target, there is processing using the server 1 where the electronic mail is the printing request. The electronic mail address which is the destination of the printing request which is different for each printer is display on a screen of the management terminal 3 or printed using the printer 4 as already described in the setup sequence. Accordingly, the management user which registers the printer 4 in the server 1 using the management terminal 3 and the guest user which is notified of the electronic mail address from the management user are able to transmit the printing request with regard to the printer 4 to the server 1 using an arbitrary terminal. Below, an electronic mail is transmitted from the guest terminal 2 to the email address which corresponds to the printer 4 as the printing request.

When the electronic mail is transmitted as the printing request, the server 1 generates a printing job which corresponds to the printing request (S302). Specifically, it is as follows.

The electronic mail which is the printing request is received by the SMTP server 101. When the electronic mail with the destination of the electronic mail address which has been registered is received by the SMTP server 101, the data conversion service AP server 102 analyses the electronic mail by acquiring the electronic mail from the SMTP server 101, the main body and the attached file which corresponds to the data conversion server 103 are extracted as printing targets and a job ID is applied to each of the files with regard to the printing targets which have been extracted. Then, the data conversion AP server 102 specifies the internal ID and the model ID of the printer 4 which corresponds to the electronic mail address which is the destination of the electronic mail by referencing the DB server 106. Next, the data conversion AP server 102 transfers the printing target to the data conversion server 103 so as to correspond to the job ID and the model ID. The data conversion server 103 converts each of the printing targets which have been acquired to printing data which corresponds to the model of the printer based on the model ID. At this time, the data conversion server 103 generates the printing data using a page description language which is specialized for text if the printing target is mainly text and generates the printing data using a page description language which is specialized for images if the printing target is mainly images. Whether the printing target is mainly text or whether the printing target is mainly images is determined based on an expander of the file which is acquired as the printing request. When the printing data is generated, the data conversion AP server 102 stores the printing data in the DB server 106 as a printing job of the printer 4 so as to be linked to the internal ID of the printer 4 and the job ID, and the generation of the new printing job is notified to the printer communication AP server 105 along with the internal ID of the printer 4.

The printer communication AP server 105 which is notified of the generation of the new printing job notifies the printer 4 of printing waiting information using XMPP in the same manner as S128 of the setup sequence (S304).

The process from the receiving of the printing request up until the transmission of the printing waiting information to the printer 4 in this manner is able to be automatically executed by the server 1 since the printing waiting information is transmitted using XMPP and polling from the printer 4 is not necessary. As a result, it is possible of the generation of the printing job to be immediately notified to the printer 4, and in addition, it is possible of the printer 4 to be notified of the generation of the printing job with the minimum amount of communication.

The printer 4 which acquires the printing waiting information transmits the reception result (success) to the XMPP server 104 using XMPP in the same manner as S138 of the setup sequence (S306).

Next, in the same manner as S140, the printer 4 requests the printing job information which is necessary for acquiring the printing data to the server 1 using HTTP (S308). The printer 4 transmits the internal ID of the printer 4 to the URL of the HTTP server 108 which corresponds to the request of the printing job information using HTTP.

The server 1 which receives the request for printing job information transmits the reception result (success), the job ID, the URL of the HTTP server 108 which corresponds to the job ID, and the type of page description language of the printing job to the printer 4 as printing job information using HTTP in the same manner as S142 (S310). In the case where the printing target is formed from a plurality of files, a job ID and a URL for each file are transmitted to the printer 4 as the printing job information.

The printer 4 which acquires the printing job information waits for the printer 4 to be in an idle state and requests the transmission of the printing data by transmitting the URL which receives the printing data acquisition request to the HTTP server 108 when the printer 4 is in an idle state in the same manner as S146 (S312). At this time, the printer 4 requests the transmission of the printing data to the URL for each job ID in a case where a plurality of the job IDs are included in the printing job information which has been acquired.

The HTTP server 108 to which the transmission of the printing job information is requested transmits the reception result (success) and the printing data which corresponds to the URL which receives the printing data acquisition request to the printer 4 using HTTP in the same manner as S148 (S314).

The printer 4 which acquires the printing data executes the printing based on the printing data in the same manner as S150 (S316).

The printer 4 which has completed printing transmits the execution result information of the printing job to the HTTP server 108 in the same manner as S154 (S318).

The server 1 in which the execution result information is acquired in the HTTP server 108 updates the printing job based on the execution result information, similarly to S156 (S320).

Next, the server 1 transmits the execution result (success or failure) of the printing request to the guest terminal 2 which is the transmission origin of the printing request using an electronic mail (S322). Specifically, the content management AP server 109 generates an electronic mail where text which indicates that the printing is complete or has failed based on the execution result information and the printing target where printing is complete or has failed is the main body and the destination is the guest terminal 2 which is the transmission origin of the printing request and transmits the electronic mail which has been generated to the guest terminal 2 via the SMTP server 101.

When the guest terminal 2 receives the electronic mail (S324), the user of the guest terminal 2 is able to know the processing result of the printing request.

The processes from S312 to S324 are executed for each printing job in the order which is stored in the DB server 106. For example, in a case where a job ID which corresponds to the main body of an electronic mail and a job ID which corresponds to an attached file "A" are included in the printing job information which has been acquired and the printing job which corresponds to the main body of the electronic mail is stored first in the DB server 106, the printer 4 executes printing by acquiring the printing data which corresponds to the main body of the electronic mail by transmitting a first URL which corresponds to the main body of the electronic mail to the HTTP server 108 and transmits the execution result information to the HTTP server 108. When the HTTP server 108 receives the execution result information, the content management AP server 109 deletes the printing job which corresponds to the main body of the electronic mail from the DB server 106 based on the execution result information which has been acquired from the HTTP server 108. Then, the content management AP server 109 transmits that the printing job which corresponds to the main body of the electronic mail is complete to the guest terminal 2 using an electronic mail via the SMTP server 101. Next, the printer 4 executes printing by acquiring the printing data which corresponds to the attached file "A" by transmitting a second URL which corresponds to the attached file "A" to the HTTP server 108 and transmits the execution result information to the HTTP server 108. When the HTTP server 108 receives the execution result information, the content management AP server 109 deletes the printing job which corresponds to attached file from the DB server 106 based on the execution result information which has been acquired from the HTTP server 108. Then, the content management AP server 109 transmits that the printing job which corresponds to the attached file is complete to the guest terminal 2 using an electronic mail via the SMTP server 101.

5. OTHER EMBODIMENTS

Here, the technical scope of the invention is not limited to the embodiment described above and it is obvious that various modification may be added in the range which does not depart from the concept of the invention.

For example, an example has been described in the embodiment described above where the printer 4 is registered in the server 1 by operating the management terminal 3, but the printer 4 may be registered in the server 1 by the user I/F 46 of the printer 4 being operated by the user.

In addition, when all of the processes are complete up until S320 described above with regard to all of the printing jobs which are generated according to the printing request which was received from the guest terminal 2, the execution result (success or failure) for the entire printing request may be transmitted from the server 1 to the guest terminal 2 which is the transmission origin of the printing request using one electronic mail.

Furthermore, an example is shown in the embodiment described above where the printer 4 automatically executes printing job when the printing waiting information is received from the server 1, but for example, information which indicates the existence of the printing job may be displayed in the user I/F 46 of the printer 4 which receives the printing waiting information and the printer 4 may execute the printing job by waiting for a printing job execution instruction by the user.

In addition, an example is described in the embodiment described above where the server 1 is configured using a plurality of server computers which are physically independent, but an arbitrary physical computer configuration is possible such as the functions of the server 1 being executed by a single server computer.

In addition, with regard to the communication protocol of the printer 4 and the server 1, the printing waiting information may be transmitted from the server 1 to the printer 4 using a push type protocol (a protocol where a request from a client for execution of the process with regard to the client from a server is not necessary) and a protocol of a push type other than XMPP may be used. A portion of the communication which uses HTTP is able to be replaced with another communication protocol of a pull type (a protocol where a process with regard to the client from the server is necessarily executed according to a request from the client), and a portion of the communication using HTTP is able to be replaced with XMPP or another push type protocol. For example, instead of XMPP, Web Socket may be used.

What is claimed is:

1. A printing system comprising:
a server that receives a printing request; and
a printer that executes printing based on the printing request;
wherein the server includes:
a first server component that receives a registration request from the printer using HTTP;
a second server component that transmits XMPP connection information to the printer using HTTP;
a third server component that receives an XMPP connection request that includes the XMPP connection information, and that connects with the printer using XMPP;
a fourth server component that makes the printer print based on the printing request; and
wherein the printer includes:
a first printer component that transmits the registration request to the server using HTTP;
a second printer component that transmits the XMPP connection request that includes the XMPP connection information to the server using XMPP after the first printer component transmits the registration request; and
a third printer component that prints or displays whether or not both HTTP connection and XMPP connection with the server succeed after the first printer component transmits the registration request and after the second printer component transmits the XMPP connection request;
wherein:
the XMPP connection information transmitted by the second server component to the printer lacks a Jabber Identifier (JID); and
the printer generates its own JID.

2. The printing system according to claim 1, wherein:
the printer further includes a fourth printer component that sends to the server language information indicating a human language that is set in the printer; and
the server further includes a printing data generation unit that generates printing data based on the human language indicated in the language information.

3. The printing system according to claim 1, wherein the printer sends said printing request to the server, and the fourth server component makes the printer print based on the printer's own printing request.

4. The printing system according to claim 1, wherein the first server component that receives the registration request is a non-XMPP component,
generates the XMPP connection information independent of the third server component that connects using XMPP, and
after having generated the XMPP connection information, informs the third server component of the generated XMPP connection information.

5. The printing system according to claim 1, wherein:
the XMPP connection request transmitted by the second printer component further includes a Jabber Identifier (JID) generated by the printer.

6. The printing system according to claim 1, wherein:
in response to the third server component successfully connecting with the printer using XMPP, the printer submits said printing request to the server.

7. The printing system according to claim 1, wherein the first server component is an electronic mail server component.

8. The printing system of claim 1, wherein the printer is remote from the server.

9. The printing system according to claim 1, wherein:
the XMPP connection information transmitted by the second server component to the printer lacks a Jabber Identifier (JID).

10. The printing system according to claim 1, wherein the printer generates its own JID.

11. A remote printer connectable to a server,
said server comprising:
a first server component that receives a registration request from the printer using HTTP, said first server component responding to receiving the registration request by generating XMPP connection information for the printer;
a second server component that transmits the XMPP connection information to the printer using HTTP;
a third server component that receives from the printer an XMPP connection request that includes the XMPP connection information, and that connects with the printer using XMPP;
a fourth server component that uses HTTP to receive a printing quest and makes the printer print based on the printing request; and
said remote printer comprising:
a first printer component that transmits the registration request to the server using HTTP;
a second printer component that transmits to the third server component the XMPP connection request that includes the XMPP connection information using XMPP after the first printer component transmits the registration request; and
a third printer component that prints or displays whether or not both HTTP connection and XMPP connection with the server succeed after the first printer component transmits the registration request and after the second printer component transmits the XMPP connection request;
wherein:
the XMPP connection information transmitted by the second server component to the printer lacks a Jabber Identifier (JID); and
the printer generates its own JID.

12. The printer according to claim 11, wherein:
the printer further comprises a fourth printer component that sends to the server language information indicative of a human language set in the printer; and
the server further comprises a printing data generation unit that generates printing data including human-readable information in the human language indicated in the language information.

13. The printer according to claim 11, wherein the first server component that receives the registration request is a non-XMPP component,
generates the XMPP connection information independent of the third server component that connects using XMPP, and
after having generated the XMPP connection information, informs the third server component of the generated XMPP connection information.

14. The printer according to claim 11, wherein:
in response to the third server component successfully connecting with the printer using XMPP, the printer submits said printing request to the server, and the fourth server component makes the printer print based on the printer..s own printing request.

15. The printer according to claim 11, wherein the first server component is an electronic mail server component.

16. The printer according to claim 11, wherein:
the XMPP connection request transmitted by the second printer component further includes the JID generated by the printer.

17. A remote printer that connects to a server that provides print jobs to preregistered output printing units,
said server comprising:
- a first server component that receives a registration request using HTTP, said registration request being a request for registering as one of said output printing units, said first component responding to receiving the registration request by registering the transmission origin of the registration request as an output printing unit and generating XMPP connection information;
- a second server component that transmits the XMPP connection information to the transmission origin of the registration request using HTTP;
- a third server component that receives an XMPP connection request that includes the XMPP connection information, and that connects with the transmission origin of the XMPP connection request using XMPP;
- a fourth server component that uses HTTP to receive a printing quest that specifies a preregistered output printing unit as a target printer to which to print, and makes the target printer print based on the printing request; and said remote printer comprising:
- a first printer component that transmits the registration request to the server;
- a second printer component that transmits to the third server component the XMPP connection request that includes the XMPP connection information provided by the second server component; and
- a third printer component that prints or displays whether or not XMPP connection with the server and registration to the server succeed;

wherein the first server component that receives the registration request is a non-XMPP component, generates the XMPP connection information independent of the third server component that connects using XMPP, and after having generated the XMPP connection information, informs the third server component of the generated XMPP connection information; and wherein: the XMPP connection information transmitted by the second server component to the transmission origin of the registration request lacks a Jabber Identifier (JID); and the transmission origin of the registration request generates its own JID.

18. The printer according to claim 17, wherein:
the remote printer is the transmission origin of the registration request; and
the XMPP connection request transmitted by the second printer component further includes the JID generated by the remote printer.

* * * * *